United States Patent
Offer et al.

(10) Patent No.: US 8,539,484 B1
(45) Date of Patent: Sep. 17, 2013

(54) MULTI-PLATFORM COMPUTER SYSTEM MANAGEMENT FOR VIRTUALIZED ENVIRONMENTS

(75) Inventors: Richard Offer, San Jose, CA (US); Lynn LeBlanc, San Jose, CA (US)

(73) Assignee: HotLink Corporation, San Jose, CA (US)

( * ) Notice: Subject to any disclaimer, the term of this patent is extended or adjusted under 35 U.S.C. 154(b) by 247 days.

(21) Appl. No.: 13/115,008

(22) Filed: May 24, 2011

Related U.S. Application Data

(60) Provisional application No. 61/348,445, filed on May 26, 2010.

(51) Int. Cl.
G06F 9/455 (2006.01)

(52) U.S. Cl.
USPC .................................................. 718/1

(58) Field of Classification Search
USPC .................................................. 718/1
See application file for complete search history.

(56) References Cited

U.S. PATENT DOCUMENTS

| | | | |
|---|---|---|---|
| 2002/0016166 A1* | 2/2002 | Uchida et al. | 455/419 |
| 2005/0188144 A1* | 8/2005 | Park et al. | 710/315 |
| 2007/0038703 A1* | 2/2007 | Tendjoukian et al. | 709/206 |
| 2008/0215793 A1* | 9/2008 | Hashimoto et al. | 711/6 |
| 2008/0282243 A1* | 11/2008 | Seguin et al. | 718/1 |
| 2009/0327643 A1* | 12/2009 | Goodman et al. | 711/173 |
| 2010/0107162 A1* | 4/2010 | Edwards et al. | 718/1 |

\* cited by examiner

*Primary Examiner* — Emerson Puente
*Assistant Examiner* — Steven Do
(74) *Attorney, Agent, or Firm* — PetersVerny, LLP

(57) ABSTRACT

A virtual machine management system is configured to manage a plurality of computing systems each configured to support virtual machines. The virtual management system is configured to transparently manage the computing systems even in cases where the virtual machines are supported by different hypervisors. In some embodiments, this capability simplifies the management of cloud computing systems including software provided by different virtual machine vendors.

27 Claims, 8 Drawing Sheets

MULTI-PLATFORM COMPUTER SYSTEM MANAGEMENT FOR VIRTUALIZED ENVIRONMENTS

CROSS-REFERENCE TO RELATED APPLICATIONS

This application claims benefit and priority of U.S. Provisional Patent Application Ser. No. 61/348,445 filed May 26, 2010. The disclosure of this provisional application is hereby incorporated herein by reference.

BACKGROUND

1. Field of the Invention

The invention is in the field of computer system management and more specifically, the management of virtualized and cloud-based computer system resources.

2. Related Art

Virtualized computing using machine hypervisors such as VMware's vSphere, VMware Workstation, Microsoft's Hyper-V and the open source hypervisors, Xen and KVM, have become a popular way to provide computing resources not only inside the computer data center but also form a key component of cloud-based computer resources. Using machine hypervisors allows many virtualized computer operating system environments ("guests" or virtual machines) to be executed in isolation from each other on a single physical hardware computer system.

As the number of virtualized environments and machine hypervisors increased, new computer system management tools were required in order to maintain the increasingly complex datacenter. The tools are typically supplied by the hypervisor vendor and normally implemented as separate management clients and servers. The client-server communication protocol is typically a mix of public and private APIs that are proprietary to the platform vendor. In this case proprietary is used to mean that an industry or other standards body does not control the APIs, rather than closed vs. open source. Those management tools that support multiple hypervisors do so by replacing the management client and accessing each hypervisor's functionality using its public management API.

FIG. 1 illustrates a typical management infrastructure for virtualized environments of the prior art.

Management Client 100 communicates to a management service 120 executing on the computer 101 comprising CPU 102, memory 103, network I/O 104 and storage 105, using the platform's native public APIs 110 or native private APIs 111. The management service 120 communicates to remote hypervisors 131, 151, 171 each running on their own computer system 130, 150, 170 respectively. Each computing system 130, 150, 170 comprises a CPU 141, memory 143, storage 144 and network I/O 145. The protocol used for communication between the management service 120 and the hypervisors 131, 151, 171 is platform specific. Management Client 100 may directly communicate with hypervisors 131, 151, 171 for high performance, low latency data streams such as a virtual machine's remote console. Hypervisor 131 may itself expose a set of public APIs 132 or private APIs 133 for use by the management server 120 or the Management Client 100. The APIs 132, 133 expose virtualized views of the physical resources of the hypervisor such as CPU 141, memory 143, storage 144 and networking interfaces 145. The APIs may also expose logical resources such as virtual machines 134, virtual networking 135 and configuration data for the various software components that make up the hypervisor platform. Hypervisors 131, 151, 171 may communicate with the management server 120 directly, rather than waiting for the management server to poll them for new data.

FIG. 2 illustrates the typical components of Management Service 120 as found in the prior art.

Management Service 120 typically comprises a datastore 210, authentication service 220, web-based management console 230. The datastore 210 stores both permanent configuration information and time-based performance metrics for aggregating and reporting. The data in datastore 210 may be stored as records in a SQL database, a flat file or other storage layout. The datastore may be co-located with the management service 120, or as part of a remote datastore 260 executing on computing system 250, itself comprising CPU 251, memory 252, network I/O 253 and storage 254. The authentication service 220, may use remote authentication services 240

Each hypervisor vendor has adopted its own architecture for implementing its public APIs. Each follows a different and non-compatible route. For example VMware utilizes a SOAP based API, Microsoft uses WMI, Xen uses XML-RPC, Red Hat KVM a client-server API, while the Amazon cloud service currently supports both a SOAP and non-XML REST-based interface. Even with the technology, each has unique API implementation details that make supporting multiple hypervisor platforms a complex and incomplete task, including the use of private or undocumented APIs.

SUMMARY

Embodiments of the invention include systems and methods that allow for the efficient management of multiple different computer platforms including virtualized, physical and cloud based resources using the "native" unmodified management client of choice and its corresponding management server. As used herein, the term "native" means that if the user wanted to manage VMware's vSphere hypervisor the user would use VMware's management client, as an alternative to or in addition to a third party client. A variety of hypervisors, from different vendors, can be managed from a single utility on a management client. Further, a specific hypervisor may be managed by management clients from different vendors.

In some embodiments, extending the functionality of the existing, platform management client and servers without modifying either is achieved using a combination of automatic data object transformation and native service brokers typically integrated using a message bus or other inter-process communication architecture. In some embodiments, extending the functionality of platform management clients and servers includes using a transform agent to intercept communications between a management server and a hypervisor.

Various embodiments of the invention include a system comprising a first computer system including non-volatile storage and a first hypervisor, the first hypervisor configured to support a plurality of virtual machines on the first computer system and to receive commands according to a first hypervisor protocol; a second computer system including non-volatile storage and a second hypervisor, the second hypervisor configured to support a plurality of virtual machines on the second computer system and to receive commands according to a second hypervisor protocol, the first hypervisor protocol and the second hypervisor protocol having first and second command spaces, respectively; a first management server configured to manage the first hypervisor according to the first hypervisor protocol; and a transform server configured to process a command sent from the first management server to the second computer system, the processing being based on virtual machine data stored on the non-volatile storage the second computer system.

Various embodiments of the invention include a method of managing a virtual machine, the method comprising receiving a command from a virtual machine management server configured to manage a first hypervisor, the command being directed toward a computing system configured to host a plurality of virtual machines; determining that processing of the command is dependent on data stored on the computing system; redirecting the received command to a transformation engine disposed on a transform server, based on the determination that the processing of the command is dependent on the data; and processing the command on the transformation engine using a copy of the data stored on the computing system.

Various embodiments of the invention include a system comprising a first management server including management logic configured to manage a hypervisor according to a first hypervisor protocol, and first metadata storage configured to store metadata characterizing the hypervisor according to the first hypervisor protocol, the hypervisor being configured to support one or more virtual machines; a second management server including management logic configured to manage the hypervisor according to a second hypervisor protocol, and second metadata storage configured to store metadata characterizing the hypervisor according to the second hypervisor protocol, the first hypervisor protocol having a different command space than the second hypervisor protocol; a transformation engine configured to receive the first metadata from a first transform agent, to transform the first metadata to a form that characterizes the hypervisor according to the second hypervisor protocol, and to send the transformed metadata to a second transform agent, the second transform agent being configured to communicate the transformed metadata to a second management server according to a second hypervisor protocol; and a computer system including the hypervisor, the first transform agent, the second transform agent, and virtual machine data. the transform of the first metadata by the transformation engine being based on the virtual machine data. In these embodiments the first transform agent is optionally configured to communicate the first metadata to the transformation engine in real-time, and the transformation engine is configured to transform the first metadata to the second hypervisor protocol in real-time.

DETAILED DESCRIPTION

A hypervisor, also called virtual machine manager (VMM), is one of many hardware virtualization techniques that allow multiple operating systems, termed guests, to run concurrently on a host computer. It is so named because it is conceptually one level higher than a supervisory program. The hypervisor presents to the guest operating systems a virtual operating platform and manages the execution of the guest operating systems. Multiple instances of a variety of operating systems may share the virtualized hardware resources. Hypervisors are typically installed on server hardware whose only task is to run guest operating systems. Non-hypervisor virtualization systems are used for similar tasks on dedicated server hardware, but also commonly on desktop, portable and even handheld computers.

Figure 1:
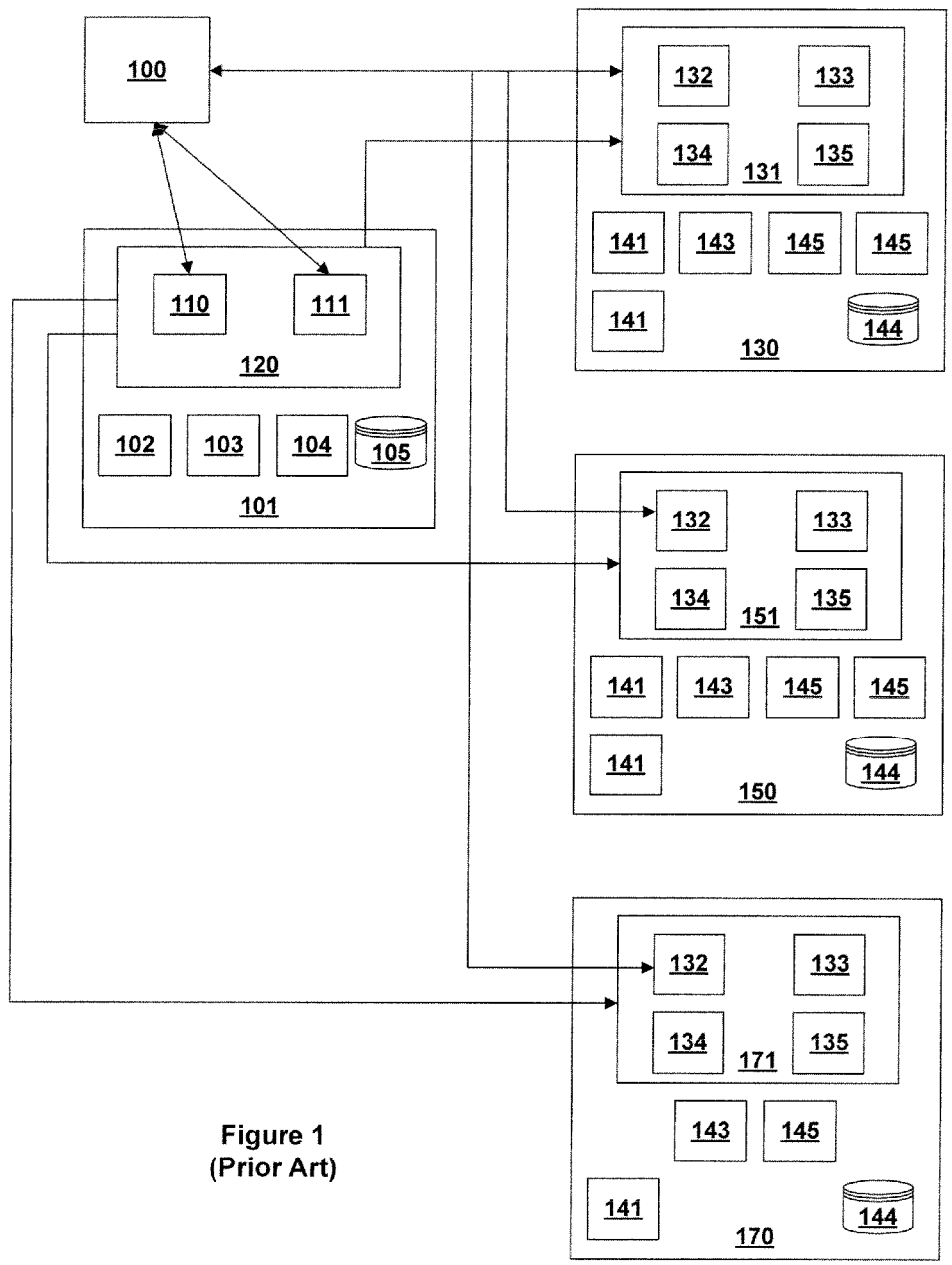
FIG. 1 illustrates a typical management infrastructure for virtualized environments of the prior art.
Figure 2:
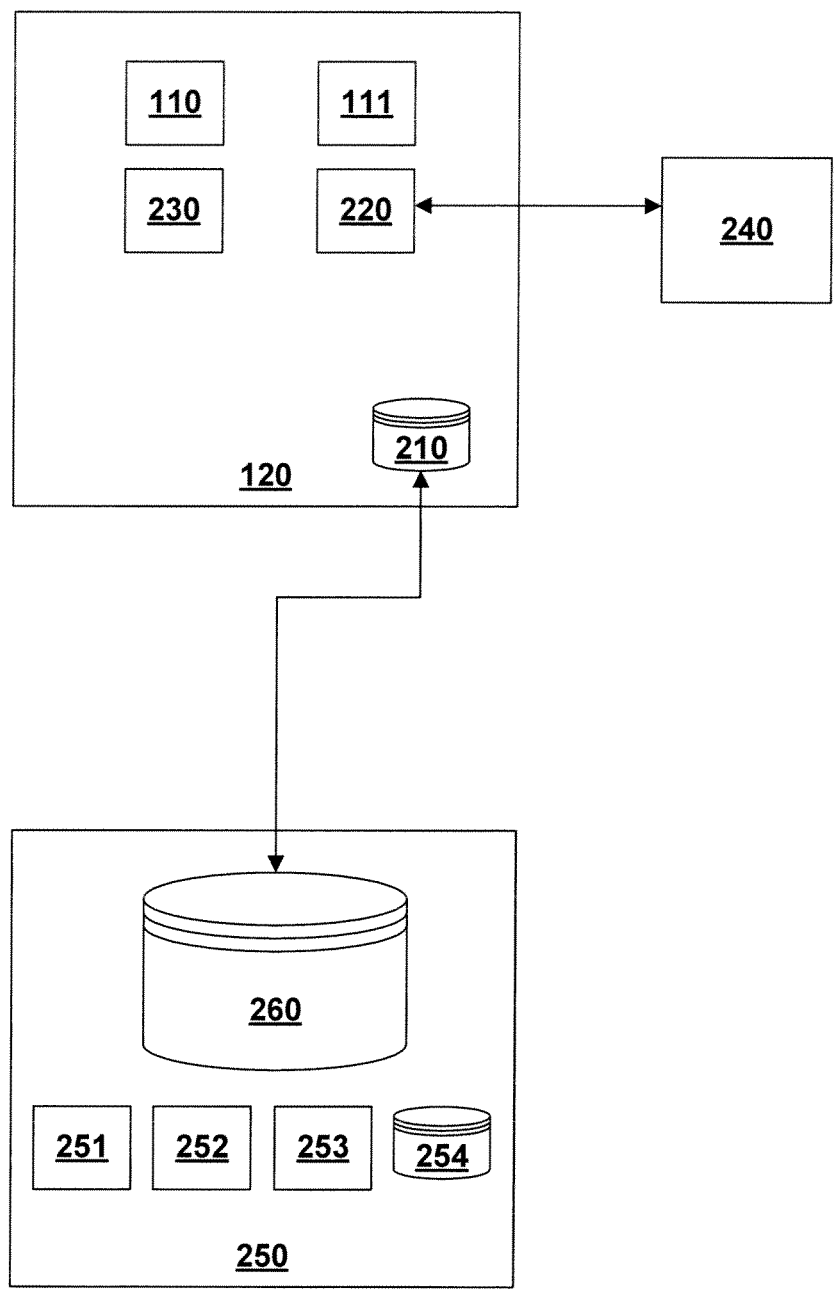
FIG. 2 illustrates the typical components of Management Service 120 as found in the prior art.
Figure 3:
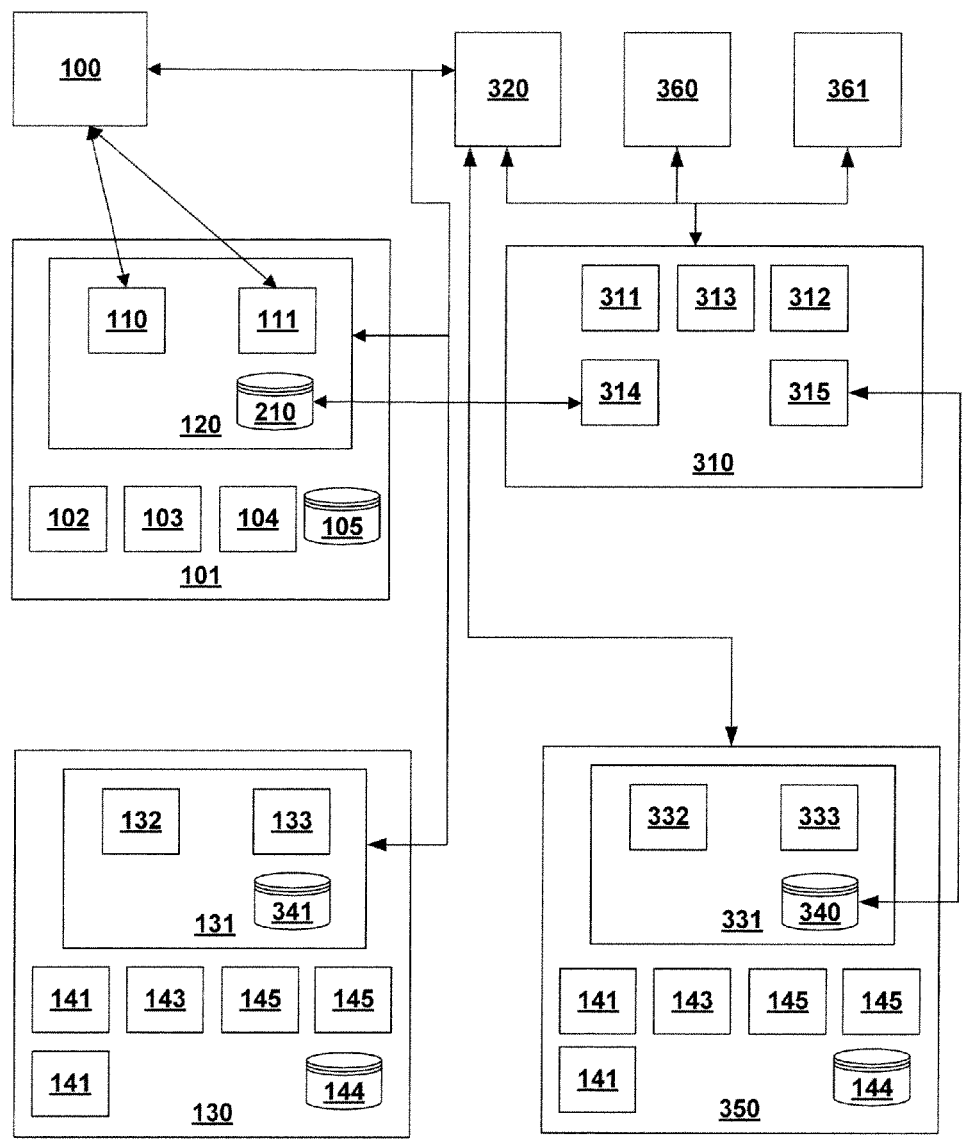
FIG. 3 illustrates typical components and connections of a cloud based computing system, according to various embodiments of the invention.

FIG. 3 illustrates typical components and connections of a cloud based computing system, according to various embodiments of the invention.

Management client 100 accesses the native management server 120 using the native management APIs 110 and 111.

Management server 120 stores its view of the complete virtualized environment including details of the various hypervisor host computer systems, the virtual machines and how each is configured in the datastore 210.

Management server 120 and hypervisor 130 are compatible, the server has built-in support for the hypervisor, in this case no data transformation or brokers are required and server 120 can simply use the APIs 132, 133. The hypervisor 130 stores its configuration data in the hypervisor datastore, 341.

Hypervisor 331 represents a platform that is not natively compatible with management server 120; in this case, the data reader 315 reads the hypervisor datastore 340 and presents the data to the message bus 310 for further routing and transformation. In some embodiments, data reader 315 may use APIs 332 and 333 to access the hypervisors data where the hypervisor store is available on the hypervisor platform.

Message bus 310 may include message parser 311, transformation engine 313, message router 312 and data writer 314.

Native service broker 320 accesses the transformed data via the message bus 310, and may need to communicate direct with hypervisor 331 for high performance, low latency data streams, such as remote console display using a combination of public and private APIs, 332 and 333 respectively.

Service brokers 360, 361 represent additional network services that may make use of the multi-platform data available via the bus 310. An example being the aggregation of performance metrics across the computer environments in the data center without using any additional agents on each environment.

Each of the components comprising the service brokers and bus may be executed on a dedicated computer system, or multiple components may be combined and executed two or more computer systems. Performance requirements outside of the invention may dictate the specific configuration of computers systems and network interconnections.

The native service brokers receive messages from the native management infrastructure (clients or servers) and provide commonality of features across two or more different platforms by using the broker's own implementation for those features any given platform is missing. An example of use is to support a different platform's remote console protocol within the users' management client of choice, specifically, with the VMware management client accessing the remote console of a Xen-based virtual machine, the broker performs a real-time bi-directional translation of Xen's VNC remote console protocol to VMware's MKS display protocol.

Some embodiments may utilize multiple native service brokers on different ports or utilizing different protocols. Some embodiments may use a different native broker for each platform.

Each hypervisor management platform typically relies on a permanent store of meta data that typically describes the configuration of the hypervisor, the number and configuration of any virtual machines and any other platform specific resources such as networking and storage. The meta data may also include time-based performance and usage measurements of the hypervisor, virtual machines, networking or storage resources.

The format and storage of the meta data inside datastore 340 varies between the platforms, in some it may be expressed as a series of rows and tables in a SQL database, in others a textural representation in a flat text file. Other potential formats may include binary formatted files, object-based databases or other non-SQL database. The meta data is typically locally stored on the physical machine running the hypervisor 331 or management service 120, but in some implementations it may be stored on a remote, network accessible store. Storage of the meta data on a storage area network device is commonly considered to be local storage.

Collecting the meta data from the hypervisor or hypervisor management server typically may involve a series of SQL queries against the datastore or the parsing of a binary data file on a remote machine. In some hypervisor platforms the datastore maybe held in the memory of the running hypervisor, which may require using public or private APIs 332 or 333 respectively to collect the meta data.

Figure 4:
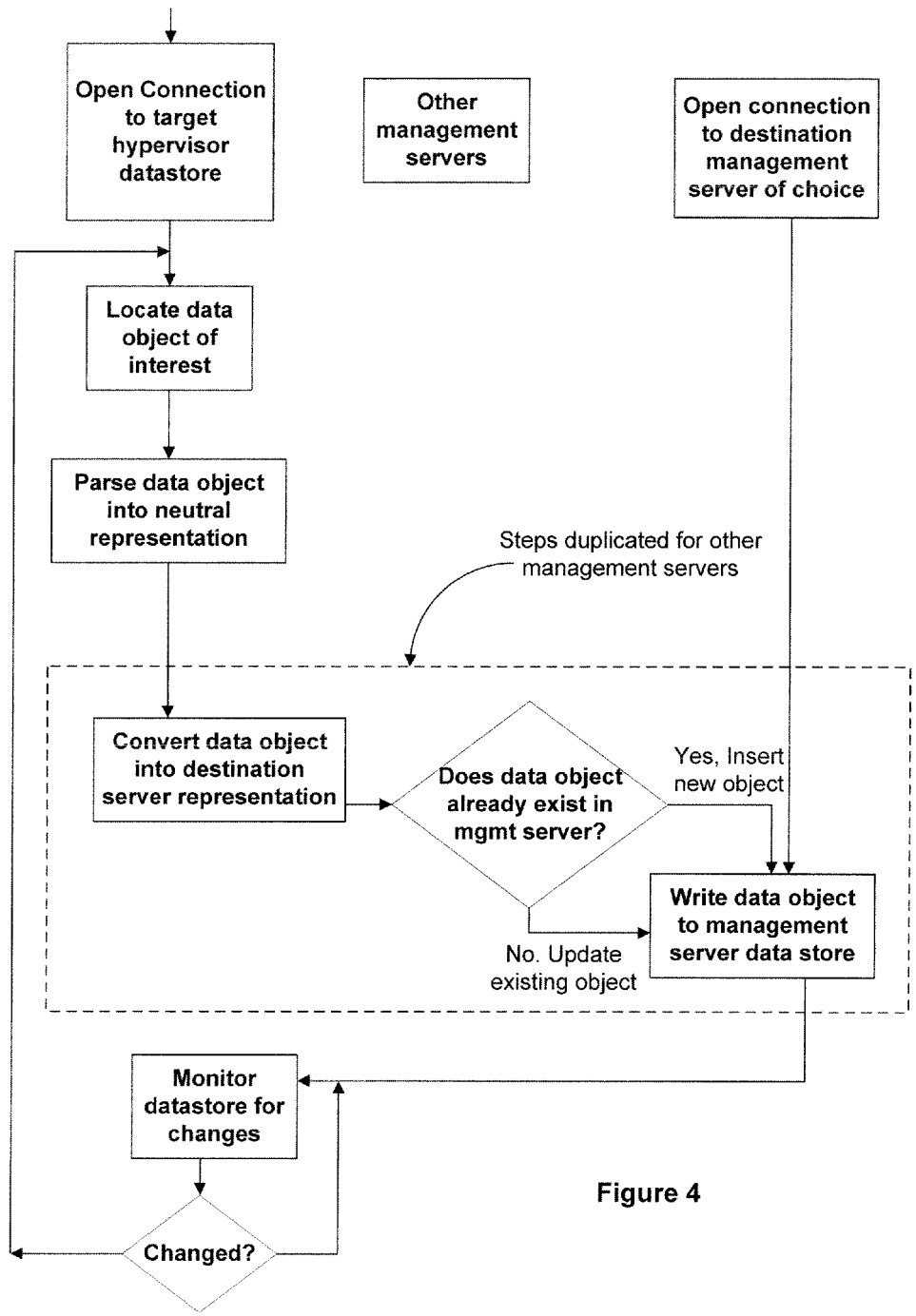
FIG. 4 illustrates methods of multi-platform data-driven transformation, according to various embodiments of the invention.

FIG. 4 illustrates methods of multi-platform data-driven transformation, according to various embodiments of the invention. These methods are optionally performed by the message parser 311, transformation engine 313 and data writer 314.

Once data reader 315 has read the platform specific meta data from the hypervisor, it is parsed into an abstract, but platform aware representation by the data parser 311. The transformation engine 313 can then translate the meta data into any of the various formats required by the native management servers. An embodiment typically chooses the translation mechanism that is closest to the abstract representation of the data that the message parser 311 generates. For example an embodiment that used XML to store the abstract representation may very well choose to use Extensible Stylesheet Language Transformations (XSTL) to transform one platforms XML abstract representation into a different platform's representation. The typical transformation cannot normally be a simple syntactic translation, but needs to include dynamic modification to insert session-based information or references to other objects. The original data read by the data reader 315 typically references identifiers and cross-references other meta data objects, that when transformed into the various other formats need to replaced with each platforms typical representation of the corresponding piece of data. This may include a combination of re-naming or re-typing. If platform 1 represented a unique hypervisor host with an integer id, while platform 2 represented its hypervisors hosts with a universal-unique identifier (UUID), then an example of a rename and retyping is converting an identifier from a field name of "id" and type "integer" to a field name of "uuid" and type "string". The corresponding values associated with each of these fields also needs to be stored for the lifetime of the original meta data in a bi-directional lookup table so that when accessing the representation of the any of the objects from any native management client that references to the object representing the corresponding original meta data are readily available.

Figure 5:
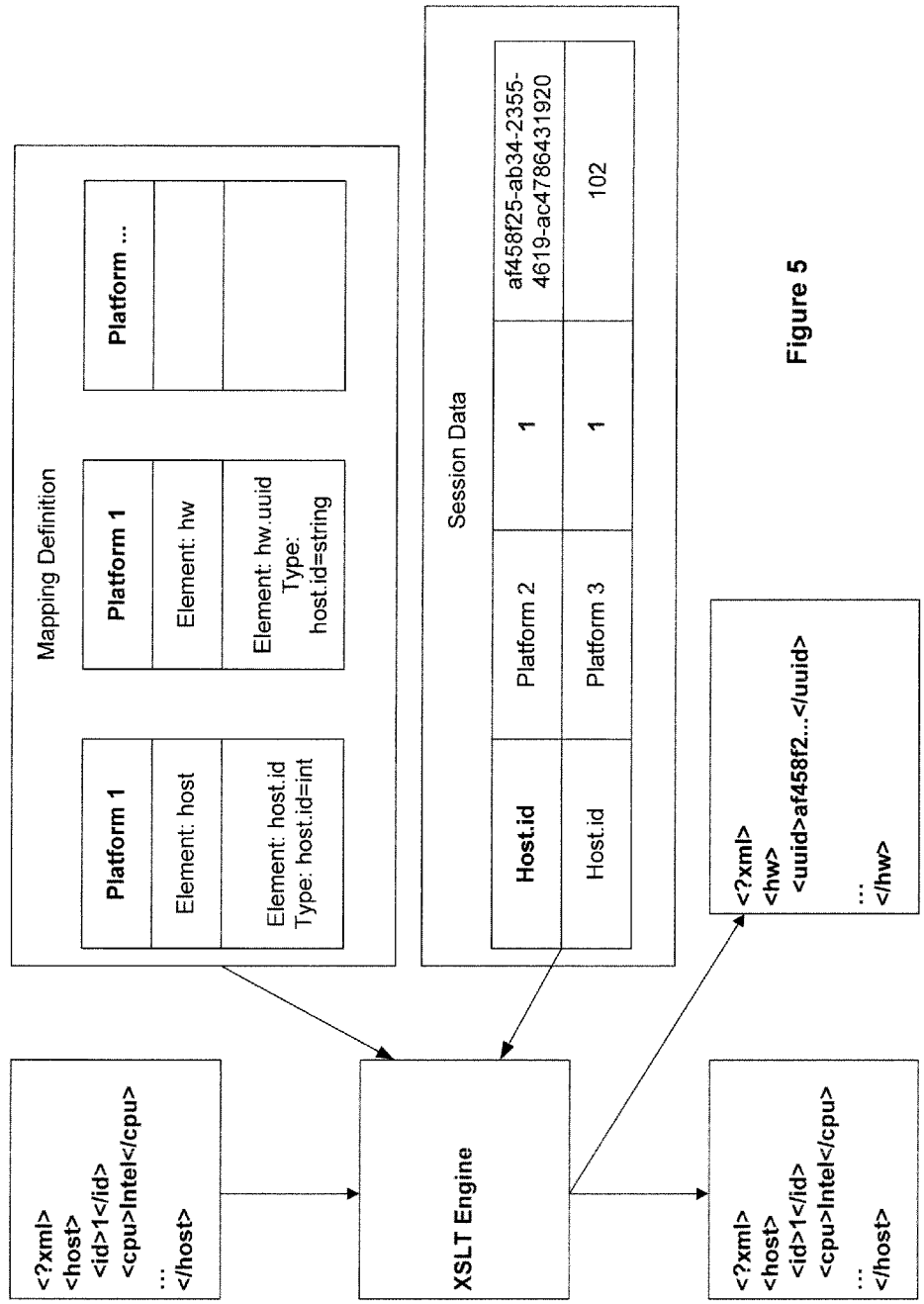
FIG. 5 illustrates an XML Translation including dynamic session aware data insertion, according to various embodiments of the invention.

FIG. 5 illustrates an XML Translation including dynamic session aware data insertion, according to various embodiments of the invention. This translation optionally includes automatic object transformation.

Abstract data 510 is supplied by the data parser to the transformation engine 313, comprising an XSLT engine 520, a mapping definition description 530 and session data store 540.

For every message containing meta data that the transformation engine 313 receives, the XSLT engine uses the mapping definition description 530 to transform the XML formatted abstract data into a new XML formatted document for the other platforms. The XSLT engine also inserts the corresponding platform specific session data obtained from the session data store into the XML document prior to creating the new document 550. In some embodiments the transformation engine may create multiple output documents, 550, 551 from a single input document.

Alternative embodiments of the invention include using other formats of representing the data, such as JavaScript Object Notation (JSON), with a corresponding change in the transformation engine.

Some embodiments may implement the abstract data representation as executable code, including both the data and the methods of transformation into an object-orientated representation. The transformation methods may be implemented dynamically, or the embodiment may pre-calculate the transformation mappings needed and compile them into the executable code. The transformation methods typically still have to handle the object specific session data.

In some embodiments, a single network service broker may broker services for multiple hypervisor hosts using a combination of multiple network ports, name-based virtual hosts, network address translation or other common application proxy-ing techniques.

Figure 6:
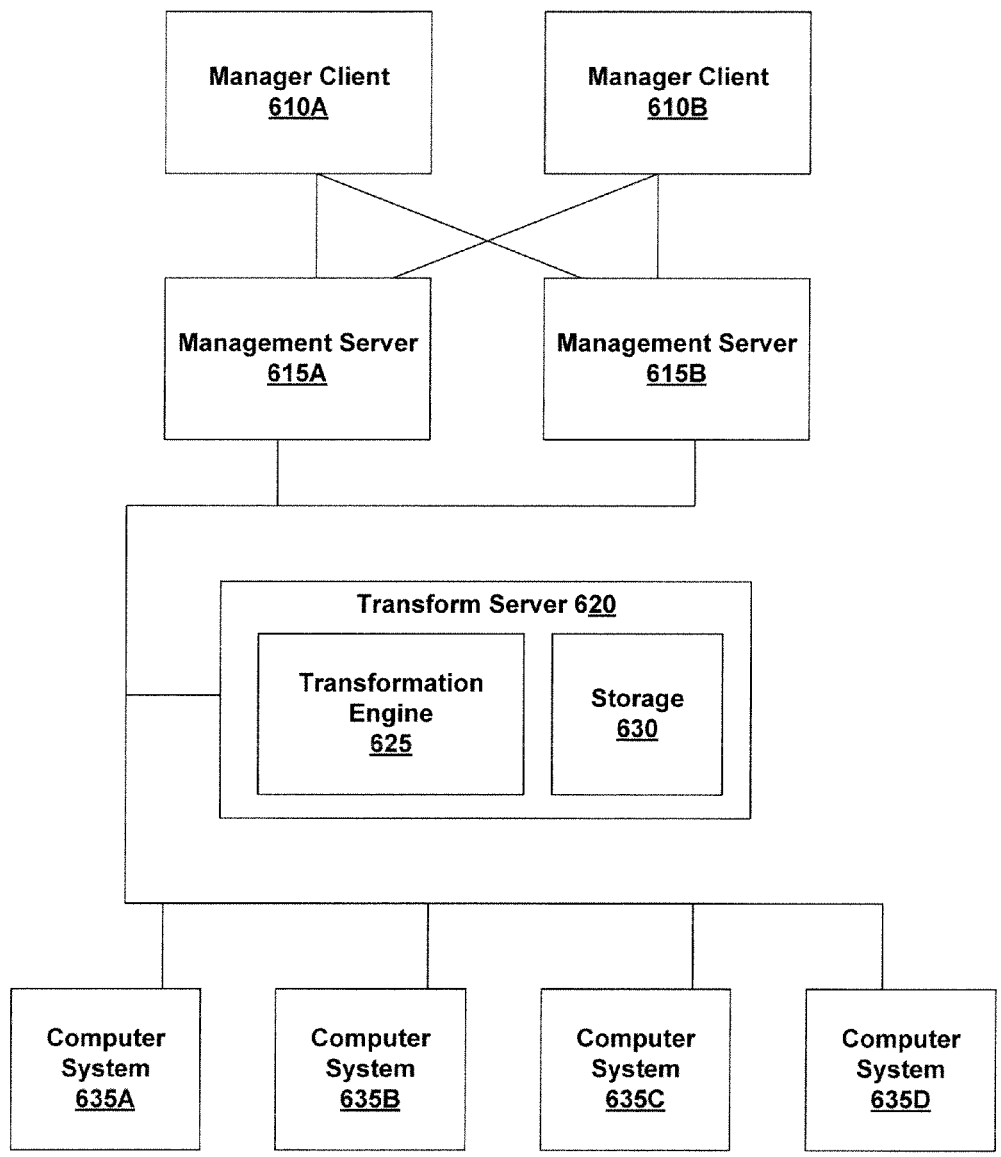
FIG. 6 illustrates an agent based virtual machine management system, according to various embodiments of the invention.

FIG. 6 illustrates an agent based virtual machine management system, according to various embodiments of the invention. The components illustrated in FIG. 6 are typically connected by a computing network, such as the internet, and may be disposed in different locations. The system of FIG. 6 includes one or more Manager Clients 610, individually labeled 610A, 610B, etc. Each of Manager Clients 610 is configured for a user to access one or more Management Servers 615, individually labeled, 615A, 615B, etc. Manager Clients 610 are optionally personal computers and may include an internet browser for accessing the Management Servers 615.

Each of Management Servers 615A includes hypervisor management logic (e.g., hardware, firmware and/or software stored on a computer readable medium) configured to manage at least one type of hypervisor. For example, Manager Client 615A may include software configured to manage the Xen hypervisor and Manager Client 615B may include software configured to manage the vSphere, VMware Workstation, Hyper-V, Xen and KVM hypervisors. This software is optionally prior art software each configured to manage one specific brand of hypervisor. In these cases, the management logic configured to communicate using a particular hypervisor protocol compatible with the hypervisor being managed. In some embodiments, more than one type of management software is disposed on a single member of Manager Servers 615. Manager Clients 610 are optional in embodiments in which a user enters commands directly into one or more of Management Servers 615.

A hypervisor protocol includes a set of virtual machine commands that can be used in one or more syntax. A hypervisor protocol is also characterized by a command space. A command space represents the functionality of all the commands in the hypervisor protocol. Two different hypervisor protocols may have different sets of commands but the same command space if their commands are capable of being mapped on a 1-to-1 basis in terms of their functionality. This can occur when commands differ merely in their names, but not their syntax and/or operation. Hypervisor protocols have different command spaces when the functionality of their commands cannot be mapped on a 1-to-1 basis. A virtual machine command is a command to a hypervisor, the command being configured to control a hypervisor and a state of or operation of a virtual machine supported by the hypervisor. For example, virtual machine commands may be configured to create virtual machines, save virtual machine states, dismount virtual machines, move virtual machines, allocate resources to a virtual machine, power virtual machines on and off, power hypervisors on and off, allocate hypervisor resources, hypervisor configuration, and/or the like. Virtual machine commands can also operate on groups of hypervisors or virtual machines disposed on different computing devices (hardware). Examples include, virtual machine migration, automatic fault tolerance, resource scheduling, andautomatic positioning, The system of FIG. 6 further includes a plurality of Computer Systems 635, individually labeled 635A, 635B, etc. Computer Systems 635 each include a hypervisor configured to support a plurality of virtual machines on the individual member of Computer Systems 635. Computer Systems 635 each include a server blade, a member of a cloud computing network, and/or the like. Computer Systems 635 are connected to one or more of Managements Servers 615 via a communication network, such as the internet.

Members of Computer Systems 635 can include different or the same hypervisors. For example, different members of Computer Systems 635 can include any mixture of the VMware vSphere, Microsoft Hyper-V, Citrix Xen or Red Hat KVM hypervisors, or other hypervisor. Each of the hypervisors included on Computer Systems 635 are typically configured to receive commands according to their own specific hypervisor protocol. The different hypervisors may have their own, different, command spaces.

In various embodiments the hypervisor management logic executing on Management Server 615A may be configured to use the hypervisor protocols used by the hypervisor of none of Computer Systems 635, used by Computer System 635A but not 635B-635C, used by Computer Systems 635A and 635B but not 635C and 635D, or used by Computer Systems 635A-635C but not 635D.

The system of FIG. 6 further includes a Transform Server 620. Transform Server 620 includes a central processing unit (not shown), a Transformation Engine 625 and an optional Storage 630. Transformation Engine 625 is configured to process a virtual machine command sent from one of Management Servers 615 to one or more of Computer Systems 635. Transformation Engine 625 is further configured to process virtual machine commands whose execution is dependent on a state of one or more of Computer Systems 635. This state is typically represented by virtual machine data stored on the respective member of Computer Systems 635. For example, a command intended to reconfigure the hardware virtualized by a virtual machine can require the use of data representative of a current configuration of the virtual machine, also, adding additional virtual resources to a hypervisor can require data representative of the hypervisor configuration.

States on which the execution of virtual machine commands are dependent can include the states of one or more members of Computer Systems 635 as well as the states of virtual machines executing on the one or more members of Computer Systems 635. For example, a command to move a virtual machine between two members of Computer Systems 635 may be dependent on the identity of applications running within the virtual machine and what resources are already allocated on the destination Computer System 635.

When processing of a command is dependent on virtual machine data, the functionality of the command can be dependent on the virtual machine data. As such, commands whose processing is dependent on virtual machine data cannot simply be mapped from one command set to another. The virtual machine data must be used to determine the functionality of the command. Only after this functionality is determined can the command be transformed from a command space of one hypervisor protocol to the command space of another hypervisor protocol. Transformation Engine 625 is configured to do more than merely translate a command from the command set of one hypervisor to the command set of another hypervisor, Transformation Engine 625 is configured to transform a command based on virtual machine data such that the functionality of the command is properly represented in the result.

In some embodiments, Transformation Engine 625 is configured to process commands that are members of different hypervisor protocols. For example, Transform Agent 715A may be configured to redirect virtual machine commands received using a first virtual machine protocol to Transformation Engine 625 while Transform Agent 715B is configured to redirect virtual machine commands received using a second virtual machine protocol. In embodiments wherein both Transform Agent 715A and Transform Agent 715B both forward the virtual machine commands directly to Transformation Engine 625, Transformation Engine 625 is configured to receive commands of two different virtual machine protocols, and optionally of two different command spaces. As such, Transformation Engine 625 is configured to receive commands in a command space that is at least a union of the command spaces of the two virtual machine protocols that the Transform Agents 715A and 715B are configured to receive.

Storage 630 is configured to store the virtual machine data used in processing virtual machine commands. Storage 630 is typically, non-volatile storage such as a hard drive, flash memory, magnetic memory, optical memory, and/or the like. Typically, the virtual machine data stored in Storage 630 includes copies of virtual machine data stored on members of Computer Systems 635. For example, in some embodiments, Storage 630 includes a copy of virtual machine data stored on Computer System 635A, a copy of virtual machine data stored on Computer System 635B and/or a copy of virtual machine data stored on Computer System 635C. Storage 630 is optional in embodiments wherein Transformation Engine 625 is configured to read and write data directly from members of Computer Systems 635. Virtual machine data copied from different members of Computer Systems 635 is optionally stored on different parts of Storage 630, respectively.

Figure 7:
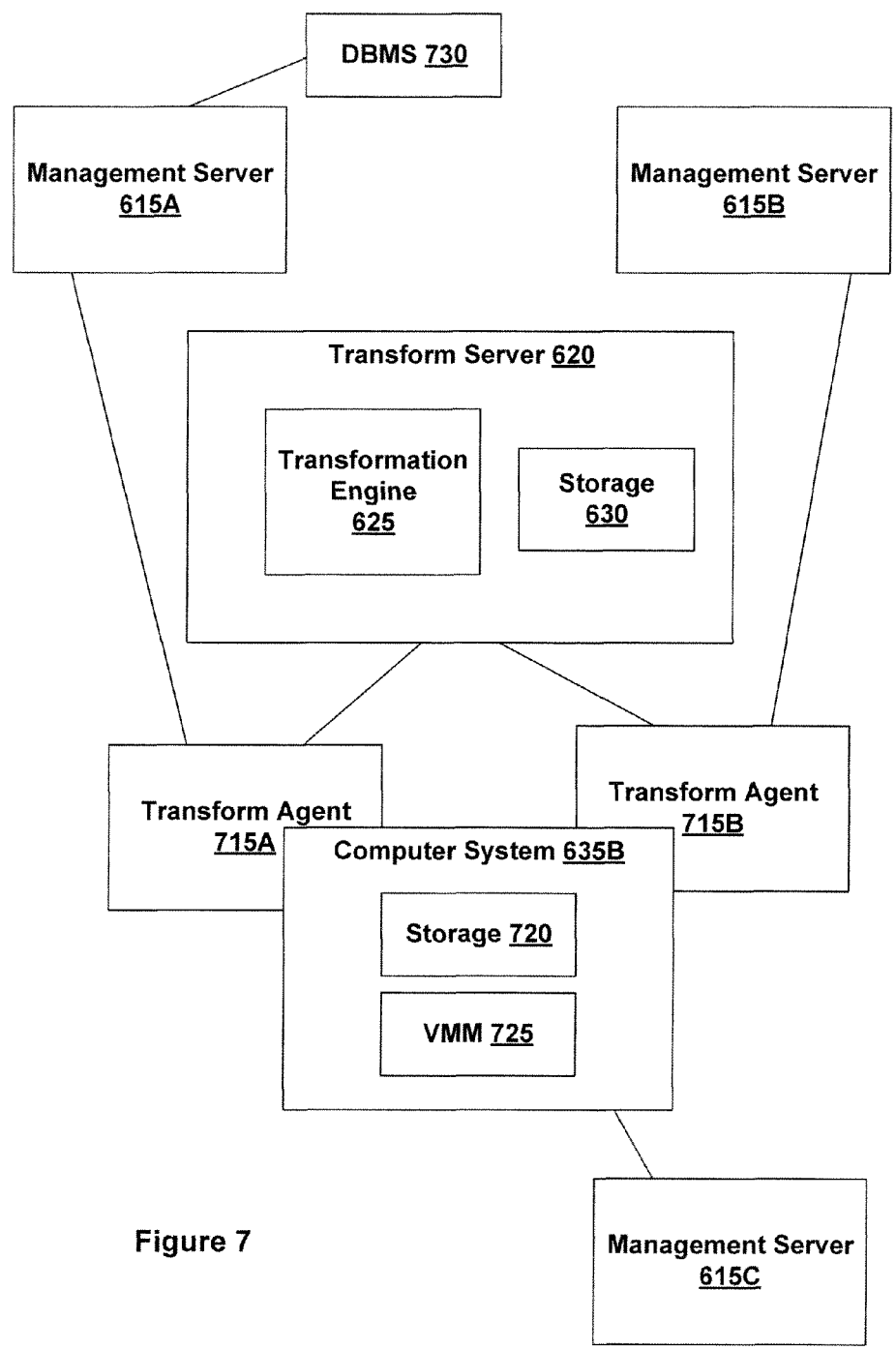
FIG. 7 illustrates a transform agent configured to facilitate communication to and from a computing system, according to various embodiments of the invention.

FIG. 7 illustrates Transform Agents 715 configured to facilitate communication to and from a computing system, according to various embodiments of the invention. Transform Agents 715 are individually labeled 715A, 715B etc. and are each associated with one or more members of Computer Systems 535. In typically embodiments, Transform Agents 715 include hardware, firmware and/or software (stored on a computer readable medium) that is included in a member of Computer Systems 535. More than one of Transform Agents 715 can be included in a single member of Computer Systems 535.

In some embodiments, Transform Agent 715A is configured to redirect commands received from Management Sever 615A and Transform Agent 715B is configured to redirect commands received from Management Server 615B. Parts of Transform Agents 715A and 715B are optionally included in the same logic. Communications from Transform Agents 715A or 715B typically include an identifier and/or address of the specific member of Transform Agents 715 from which the communication is sent.

In some embodiments, Transform Agents 715 are configured to redirect all received virtual machine commands to Transformation Engine 625. In other embodiments, Transform Agents 715 are configured to determine whether or not processing of a received virtual machine command is dependent on virtual machine data stored on the associated member of Computer Systems 635. For example, Transform Agent 715A may be configured to determine if processing of a received virtual machine command is dependent on virtual machine data stored in a Storage 720. Storage 720 includes a non-volatile storage such as those discussed elsewhere herein.

In some embodiments, Transform Agent 715A is configured to determine whether or not processing of a command received from Management Server 615A is dependent on the virtual machine data stored in Storage 720. If the command is dependent on this data, then Transform Agent 715A is configured to redirect the command to Transformation Engine 625. If the command is not dependent on the virtual machine data, then Transform Agent 715A is configured to translate the command from the command space of one hypervisor to the command space of another hypervisor. Because processing of the command is not dependent on the virtual machine data, the translation can be performed by a direct mapping of the command from one command space to another, while still maintaining functionality of the command. This translation optionally occurs on Computer System 635B.

In one example, Management Server 615 is configured to send virtual machine command to Computer System 635B, this command is in a command space of a first hypervisor for which Management Server 615A is configured to manage. Transform Agent 715 is configured to intercept this command and determine if virtual machine data is required to determine functionality of the command. If the virtual machine data is required then the command is redirected from Transform Agent 715A to Transformation Engine 625. If the virtual machine data is not required then Transform Agent 715 is configured to translate the command to the command space of a hypervisor executing on Computer System 635A, e.g., a hypervisor VMM 725. The translated command is then communicated to VMM 725 for execution.

Prior to redirecting commands to Transformation Engine 625, Transform Agent 715A is optionally configured to translate the commands to a generic hypervisor protocol. The generic hypervisor protocol is typically a union of the plurality of commands in hypervisor protocols used by the hypervisors disposed on Computer Systems 635. As such, the generic hypervisor protocol includes at least one command representative of each of the virtual machine data dependent, commands that the Transform Agents 715 can be expected to receive from Management Servers 615. The command space of the generic hypervisor protocol is, likewise, a union of the command spaces of the hypervisor protocols used by Management Servers 615 and/or Computer Systems 635.

Transform Server 620 is configured to synchronize the virtual machine data stored in Storage 630 with that stored in Storage 720. When a data dependent command is processed on Transform Server 620, any resulting change in the data is stored in both Storage 630 and Storage 720. Transform Server 620 is optionally further configured to synchronize virtual machine data stored in Storage 630 and/or Storage 720 with a master copy of the virtual machine data stored in a remote location, such as a database DBMS 730.

In some embodiments, Transformation Engine 625 is configured to transform virtual machine metadata in addition to virtual machine commands. Virtual machine metadata is data that characterizes virtual machine data. For example, virtual machine metadata can include information about data format and/or data types. Like virtual machine commands, the interpretation of virtual machine metadata can be dependent on the state of a virtual machine. Some metadata operations, therefore, require consideration of virtual machine state and virtual machine data. Virtual machine metadata may, for example, characterize a format in which virtual switch configuration data is expected. How this format is expressed can depend on whether there are any virtual switches defined between virtual machines on Computer System 635B.

As with virtual machine commands, Management Servers 615A and 615B are optionally configured to handle virtual machine metadata according to specific hypervisor protocols. This virtual machine metadata is optionally stored on one or more static storage of Management Servers 615. In one example, Management Server 615A is configured to store virtual machine metadata according to a first hypervisor protocol and Management Server 615B is configured to store virtual machine metadata according to a second hypervisor protocol (optionally having a different command space). The virtual machine metadata, even though expressed in a different protocol, may represent the same hypervisor installed on the same device, e.g., VMM 725 on Computer System 635. There can, therefore, be more than one set of virtual machine metadata, in different protocols, that represent the same hypervisor.

If virtual machine metadata representing VMM 725 is modified, using for example Management Server 615A, then it is desirable to update/synchronize any other virtual machine data that may be stored by other Management Servers 615 and also represent VMM 725. For example, if Management Server 615A and Management Server 615B both store virtual machine metadata characterizing VMM, then it is desirable to keep this characterization synchronized.

The synchronization is optionally performed using Transformation Engine 625. For example, in some embodiments, Transformation Engine 625 is configured to receive first virtual machine metadata modified using Management Server 615A and sent to Computer System 635B. At Computer System 635B the modified virtual machine data is redirected to Transform Server 620 by Transform Agent 715A. Transform Agent 715A is optionally configured to first analyze whether or not conversion of the virtual machine metadata from the first protocol (of Management Server 615A) to the second protocol (of Management Server 615B) is dependent on the actual virtual machine data that is characterized by the metadata. At Transform Server 620 the virtual machine metadata is transformed from the first to the second protocols using Transformation Engine 625 based on virtual machine data stored in Storage 630 and/or Storage 720. The transformed virtual machine metadata is then sent from Transform Server 620 to Management Server 615B, optionally via Transform Agent 715B.

Using the above process, virtual machine metadata can be kept synchronized on two or more Management Servers 615. In some embodiments different versions of virtual machine metadata that characterizes the same hypervisor using different protocols are stored on DBMS 730. Synchronization is optionally performed in real-time and/or using data locking techniques that prevent the data from being improperly manipulated by two different members of Management Servers 615 at the same time. For example, Transform Agent 715A is optionally configured to communicate the virtual machine metadata to the Transform Server 620 in real-time, and the Transformation Engine 625 is optionally configured to transform the virtual machine metadata between hypervisor protocols in real-time. Transformation Engine 625 is optionally configured to transform the virtual machine metadata to a plurality of protocols.

Figure 8:
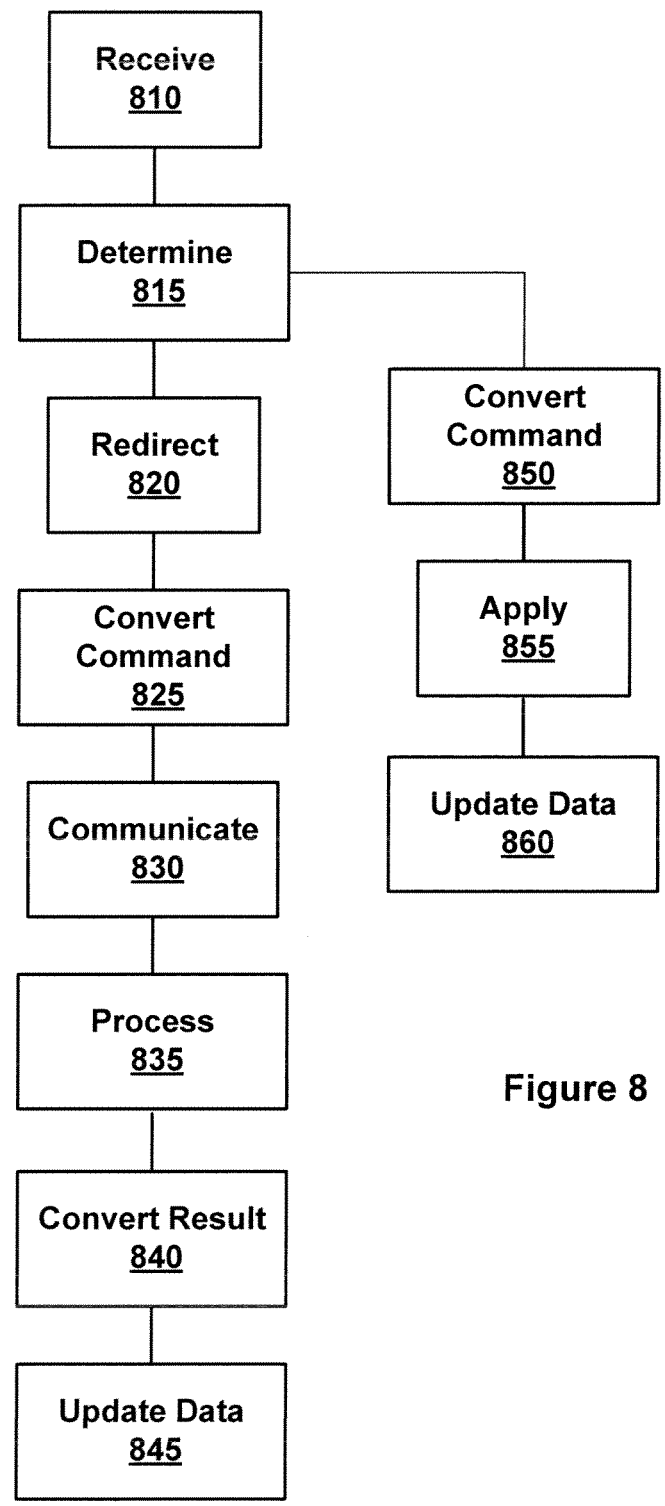
FIG. 8 illustrates methods of processing a virtual machine command, according to various embodiments of the invention.
Figure 5:
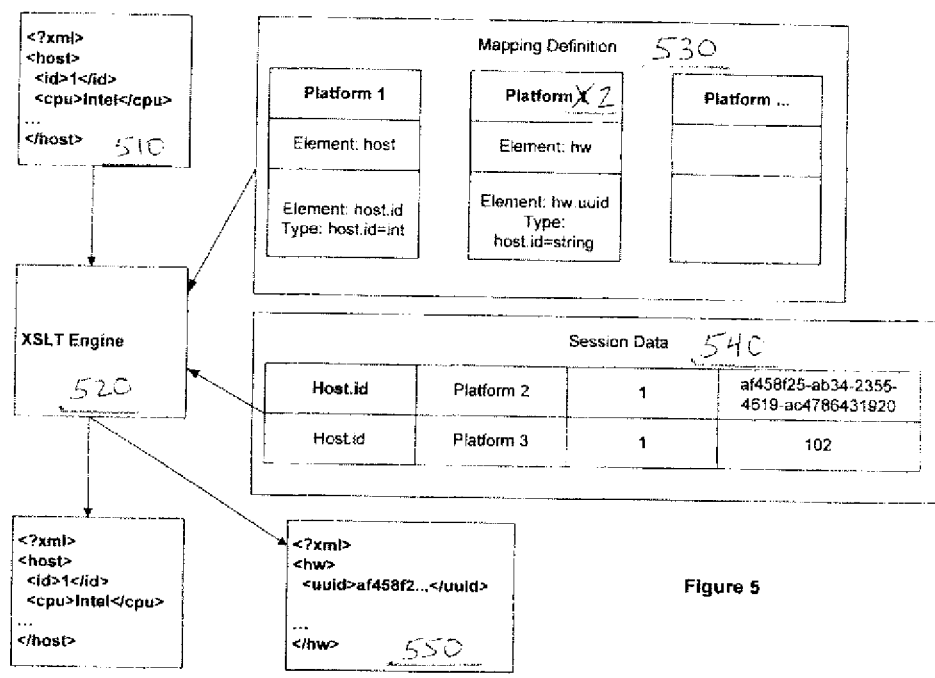
Figure 8:
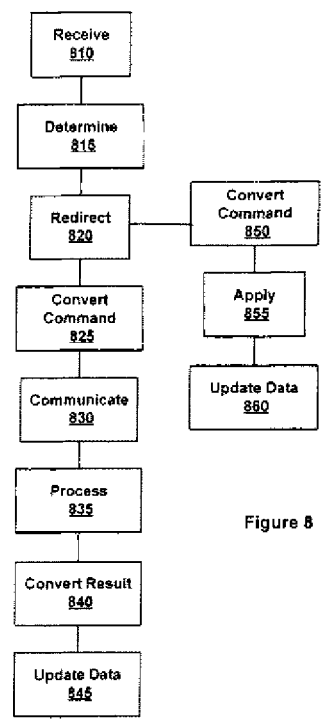

FIG. 8 illustrates methods of processing a virtual machine command, according to various embodiments of the invention.

In a Receive Step 810, a virtual machine command is received by Transform Agent 715A from Management Sever 615A. The received command is in a first hypervisor protocol. The received command is directed at Computer System 635 and is configured to manage a hypervisor.

In a Determine Step 815, Transform Agent 715A is used to determine whether or not the functionality and/or processing of the command is dependent on virtual machine data stored in Storage 720. If the functionality is not dependent, then the method precedes though Steps 850-860. If the functionality is dependent, then the method precedes through Steps 825-845. The determination is optionally based on a table of commands that that lists which commands are dependent and which are not.

In a Convert Command Step 850, the command is translated from the hypervisor protocol of Management Sever 615 to the hypervisor protocol of VMM 725.

In an Apply Step 855, the translated command is applied to VMM 725. If virtual machine data is changed as a result of the command, then in an optional Update Data Step 860, the virtual machine data stored at Storage 720 and/or 630 is updated accordingly.

In an optional Convert Command Step 825, the virtual machine command received in Receive Step 810 is translated to a command of generic virtual machine protocol. The command space of the generic virtual machine protocol is typically at least a union of the command space of all virtual machine data dependent commands that can be expected to be received from Management Servers 615 included in the system.

In a Communicate Step 830, the command, translated or not, is communicated from Transform Agent 715A to Transformation Engine 625. In a Process Step 835 the command processed by Transformation Engine 625 using the virtual machine data on which its functionality depends. In some embodiments, Process Step 835 uses a copy of the virtual machine data stored on Storage 630. In other embodiments, Process Step 835 uses the virtual machine data stored on Storage 720 and/or DBMS 730. Communicate Step 830 typically includes communicating the command over a computer network such as the internet.

In an optional Convert Result Step 840, the results of the processing are optionally converted back to the command protocol of Management Server 615A. For example, the processing of the command may result in communication back to Management Server 615. In Convert Result Step 840 this communication is converted to the proper command protocol for receipt by Management Sever 615A. In various embodiments, converted or not, the result of the processing is communicated to VMM 725.

In an optional Update Data Step 845, virtual machine data stored at Storage 720, Storage 630 and/or DBMS 730 is updated as a result of the processing of the command.

Several embodiments are specifically illustrated and/or described herein. However, it will be appreciated that modifications and variations are covered by the above teachings and within the scope of the appended claims without departing from the spirit and intended scope thereof. For example all or part of the Transformation Engine 625 may be embedded in the transform agent; or all or part of the transform agent may be embedded in the transform server. In some embodiments, a combination of network level proxies and/or Ethernet aliases are configured to make one or more of management servers 615 believe they are communicating directly with computer systems 635 when all commands are, in fact, being handled by Transform Server 620. Implementation specific architecture is dependent on the precise environment such as network bandwidth and processing power of each of the corresponding computer systems. More than one of Transform Agents 715 are optionally disposed in a single logical The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A system comprising:
   a first computing system including non-volatile storage and a first hypervisor, the first hypervisor configured to support a plurality of virtual machines on the first computing system and to receive commands according to a first hypervisor protocol;
   a second computing system including non-volatile storage and a second hypervisor, the second hypervisor configured to support a plurality of virtual machines on the second computing system and to receive commands according to a second hypervisor protocol, the first hypervisor protocol and the second hypervisor protocol having first and second command spaces, respectively;
   a first management server configured to manage the first hypervisor according to the first hypervisor protocol; and
   a transform server configured to process a command sent from the first management server to the second computing system, the processing being based on virtual machine data stored on the non-volatile storage the second computing system, the second computing system including a first transform agent configured to:
   a) redirect commands received from the first management server to the transform server,
   b) determine whether or not processing of the command is dependent on the virtual machine data, and
   c) translate the command into a command within the command space of the second hypervisor and to communicate the translated command to the second hypervisor, if the processing is not dependent on the virtual machine data.

2. The system of claim 1, wherein the first transform agent is configured to redirect the command to the transform server if the command is dependent on the virtual machine data.

3. The system of claim 2, where in the first transform agent is configured to translate the command from a first hypervisor protocol to a second protocol prior to redirecting the command to the transform server.

4. The system of claim 3, wherein the second protocol includes a command space that includes at least a union of the first and second command spaces.

5. The system of claim 1, wherein the first computing system includes a second transform agent configured to receive commands in the second command space.

6. The system of claim 1, wherein the second computing system further includes a second transform agent configured to redirect the command to the transform server, the first and second transform agents being configured to receive commands of different command spaces.

7. The system of claim 6, wherein the second transform agent is configured to translate commands from the second hypervisor protocol.

8. The system of claim 1, wherein the transform server is configured to receive commands in a command space that is at least a union of the first and second command spaces.

9. The system of claim 1, further comprising a second management server configured to manage the second hypervisor according to the second hypervisor protocol, wherein the first computing system includes a second transform agent configured to receive commands according to the second hypervisor protocol and to redirect the received commands to the transform server.

10. The system of claim 1, wherein the second computing system includes the first transform agent configured to receive commands from the first management server according to the first hypervisor protocol and includes a second transform agent configured to receive commands from a second management server according to the second hypervisor protocol.

11. The system of claim 10, wherein the first and second transform agents are each configured to translate received commands into a command space that is at least a union of the first and second command spaces.

12. The system of claim 1, wherein the command is in the command space of the first hypervisor protocol but not in the command space of the second hypervisor protocol.

13. The system of claim 1, wherein the first and second command spaces are disjoint relative to each other.

14. The system of claim 1, wherein the transform server is configured to store a copy of the virtual machine data stored on the non-volatile storage of the second computing system.

15. A system comprising:
a first computer system including non-volatile storage and a first hypervisor, the first hypervisor configured to support a plurality of virtual machines on the first computer system and to receive commands according to a first hypervisor protocol;
a second computer system including non-volatile storage and a second hypervisor, the second hypervisor configured to support a plurality of virtual machines on the second computer system and to receive commands according to a second hypervisor protocol, the first hypervisor protocol and the second hypervisor protocol having different first and second command spaces, respectively;
a first management server configured to manage the first hypervisor using a third hypervisor protocol, the third hypervisor profile being different from the first and second hypervisor protocols; and
a transform server configured to process a command sent from the first management server to the second computer system, the processing being based on virtual machine data stored on the non-volatile storage of the second computer system, the second computing system including a first transform agent configured to:
a) redirect commands received from the first management server to the transform server,
b) determine whether or not processing of the first command is dependent on the virtual machine data, and
c) translate the command into a command within the command space of the second hypervisor and to communicate the translated command to the second hypervisor, if the processing is not dependent on the virtual machine data.

16. A transform server comprising:
storage configured to store a copy of first virtual machine data from a first computing system configured to support a plurality of virtual machines;
storage configured to store a copy of second virtual machine data from a second computing system configured to support a plurality of virtual machines; and
a transformation engine configured to process a command received from any one of a plurality of transform agents, the plurality of transform agents configured to receive commands using different hypervisor protocols and to redirect the received commands to the transformation engine, each of the hypervisor protocols having a different command space, the command being a member of a command space that includes at least a union of command spaces of the different hypervisor protocols, the processing including translating the received command to a command in the command space of one of the hypervisor protocols.

17. The transform server of claim 16, wherein the transformation engine is configured to process commands in a plurality of hypervisor protocols.

18. A method of managing a virtual machine, the method comprising:
receiving a command from a virtual machine management server configured to manage a first hypervisor, the command being directed toward a computing system configured to host a plurality of virtual machines;
determining that processing of the command is dependent on data stored on the computing system;
redirecting, using a transform agent, the received command to a transformation engine disposed on a transform server, based on the determination that the processing of the command is dependent on the data, wherein the transform agent is configured to determine whether or not processing of the command is dependent on the data; and
processing the command using the transformation engine and a copy of the data stored on the computing system, the processing including translating the command into a command within the command space of a second hypervisor and communicating the translated command to the second hypervisor.

19. The method of claim 18, wherein the command is received at a translation agent disposed on the computing system.

20. The method of claim 18, further comprising converting the command from a form compatible with the first hypervisor to a generalized form, the generalized form including a command space comprising a union of at least two hypervisor command spaces.

21. The method of claim 20, wherein the command is converted by a translation agent disposed on the computing system.

22. The method of claim 20, wherein the command is redirected to the transformation engine in the converted form.

23. The method of claim 18, further comprising communicating a result of the processing of the command from the transformation engine to the computing system and forwarding the result from the computing system to the virtual machine management server.

24. The method of claim 23, wherein translating the command into the command within the command space of the second hypervisor includes converting the result from a generalized form to a form compatible with the first hypervisor, the generalized form including a command space comprising a union of at least a command space of the first hypervisor and the command space of a second hypervisor.

25. The method of claim 24, wherein the result is communicated from the transformation engine to the computing system in the generalized form and communicated from the computing system to the virtual machine management system in the form compatible with the first hypervisor.

26. The method of claim 18, further comprising updating the data stored on the computing system based on a result of the processing of the command.

27. The method of claim 18, wherein the data stored on the computing system is configured to characterize a state of a virtual machine operating on the computing system.

* * * * *

UNITED STATES PATENT AND TRADEMARK OFFICE
CERTIFICATE OF CORRECTION

| | | |
|---|---|---|
| PATENT NO. | : 8,539,484 B1 | Page 1 of 3 |
| APPLICATION NO. | : 13/115008 | |
| DATED | : September 17, 2013 | |
| INVENTOR(S) | : Richard Offer and Lynn LeBlanc | |

It is certified that error appears in the above-identified patent and that said Letters Patent is hereby corrected as shown below:

In the drawings,

Sheet 5, Fig. 5, correct as shown on attached page.

Sheet 8, Fig. 8, correct as shown on attached page.

In the specification,

Column 4, lines 30 and 33, the reference numeral "130", each occurrence, should read -131-.

Column 4, line 41, the phrase "is available" should read -is not available-.

Column 6, line 54, "Management Servers 615A" should read -Management Servers 615-.

Column 6, line 58, "Client 615A" should read -Client 610A-.

Column 6, line 59, "Client 615B" should read -Client 610B-.

Column 6, line 67, "Manager Servers" should read -Management Servers-.

Column 7, line 29, "andautomatic positioning" should read -and automatic positioning-.

Column 9, lines 1, 4 and 6, the reference numeral "535", each occurrence, should read -635-.

Column 9, line 25, "stored in a Storage" should read -stored in Storage-.

Column 12, line 25, after logical, insert --system--.

Signed and Sealed this
Twenty-fourth Day of November, 2015

Michelle K. Lee
*Director of the United States Patent and Trademark Office*